3,322,155
ACCUMULATOR SAFETY VALVE
Thomas M. Julow, South Bend, Ind., assignor to The Bendix Corporation, South Bend, Ind., a corporation of Delaware
Filed Jan. 15, 1965, Ser. No. 425,802
3 Claims. (Cl. 138—30)

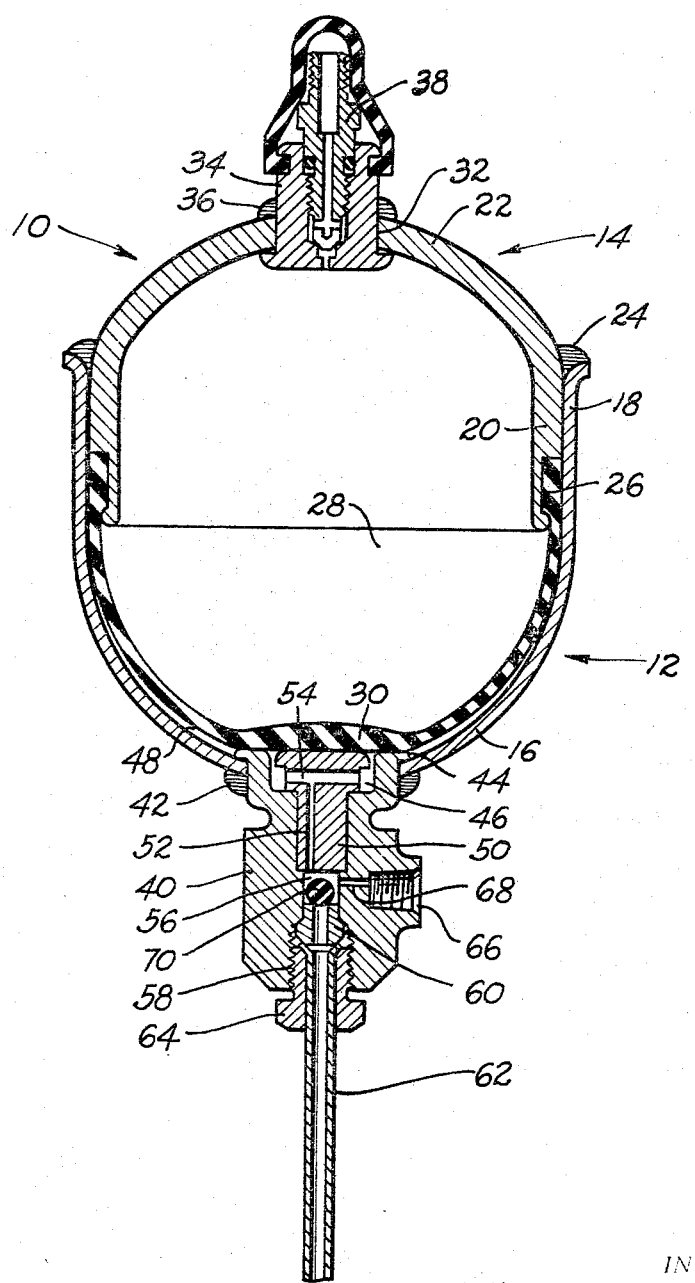

This invention relates to a hydro-pneumatic energy storage device, and more specifically to improvements in an accumulator of the bladder type which will aid in protecting against high pressure failure thereof.

As the state of art of developing inexpensive, economical and practical braking systems for automobiles advances to the area of full hydraulic power, it has become increasingly apparent that pressure storing devices such as accumulators that are necessitated by such a system may be subjected to severely adverse condition of heat due to their placement within the engine compartment of an automobile. It is, therefore, a likely consequence that during prolonged, hot running conditions and/or in the case of a fire in the engine compartment, an accumulator with a charge of nitrogen and hydraulic fluid could be potentially dangerous. Thus, it is a principal object of my invention to eliminate the potential danger of the use of accumulators in such surroundings.

It is also an object of my invention to provide a means for allowing the expansion of liquid chamber volume during adverse heating of an energy storing device such as an accumulator It is still another object of my invention to provide an expansible chamber for a hydraulic liquid within an energy storing accumulator which utilizes a deformable valve means.

Other objects and advantages of my invention will appear from the following description of the accompanying drawing showing a cross-sectional view of an accumulator incorporating a valve means in accordance with the principles of my invention.

Referring now to the single figure of the drawing, the numeral 10 designates an accumulator which has a lower shell 12 and an upper shell 14. The lower shell 12 has a spherically rounded portion 16, a cylindrical portion 18 which surrounds a cylindrical portion 20 of the upper shell 14 which also has a hemispherical portion 22. The cylindrical portions 18 and 20 of the upper and lower shells are sized to have their internal diameter and external diameter, respectively, of equal dimension so that they may be fitted one within the other and held in place by a peripheral weld 24.

As seen, the cylindrical portion 20 is grooved to receive an annular bead 26 of a bladder 28 which is molded open on one end and provided with a thickened portion 30 closing the other end. The annular bead 26 is compressed between the cylindrical portions 18 and 20 upon the assembly of the upper and lower shells to also serve as a fluid seal for the accumulator 10.

The upper shell 14 has a pneumatic opening 32 within which is assembled a pneumatic charging valve 34 that is held to shell 14 by a peripheral weld 36. As seen, the charging valve 34 comprises a valve stem 38 which is operatively threaded to the valve 34 at one end thereof and threaded at its uppermost end, as seen in the drawing, to receive a pneumatic supply line whenever it is necessary to charge the accumulator 10, as with nitrogen, etc.

A hydraulic fitting 40 is welded as at 42 to the lower shell 12, and, as seen in the drawing is in axial alignment with the charging valve 34. The hydraulic fitting 40 is provided with an annular flange portion 44 that is located within the lower shell 12 and rests upon an internal wall of the hemispherical portion 16. The annular flange 44 serves as a spacing means for the bladder 28 having the thickened portion 30 resting thereon. The fitting 40 is also provided with an axial passage that opens outwardly, as at 46, to feed a space 48 between the bladder 28 and the lower shell 12 as maintained by the flange 44. Within the passage and immediately underlying the bladder I have provided a plug 50 for the passage, which plug is drilled off-center of the axial passage of the fitting 40, as at 52, and cross drilled, as at 54, to communicate a chamber 56 underlying the plug 50 in the axial passage of the fitting 40 with the opened area surrounded by the flange 44 of the fitting 40.

The fitting 40 is also threaded as at 58 and is provided with a ferrule 60 between the threads 58 and chamber 56. The ferrule 60 provides a seat for a flared tube 62 held to the fitting 40 by means of a flared tube nut 64.

Fitting 40 is also provided with a discharge port 66 that communicates by means of a radially offset passage 68 to the chamber 56.

Within the chamber 56 I have provided a deformable ball valve 70 which is sized to have an external diameter slightly in excess of the internal diameter of the passage through the fitting 60 which is equal to the internal diameter of the flared tube 62.

In operation, a high pressure hydraulic fluid is supplied by the flared tube 62 to force the ball valve 70 from its seat with the ferrule 60 to thereby communicate high pressure fluid internally of the lower shell 12 between it and the bladder 28. In addition, fluid will flow through the radially offset passage 68 to the discharge port 66 where it may be supplied to a control valve for a fluid pressure system such as a hydraulic power braking system. Normally, such a hydraulic power braking system is a closed valve system so that the pressure in the flared tube 62 is operative to roll the bladder 28 upwardly into the upper shell 14 until the hydraulic pressure is equal to that of the gas pressure within the shell 14 and bladder 28. At this time the accumulator 10 is fully charged and operative, whenever the brake control valve is open to provide a fluid pressure of predetermined magnitude.

In the event of heat being applied externally of the accumulator 10, as may be caused by long and sustained operation under extreme high temperature conditions or upon the experiencing of a fire adjacent the accumulator 10, the gas pressure in the accumulator and the hydraulic fluid will be caused to expand to thereby stress the bladder 28 and upper and lower shells 12 and 14 to the point of fatigue. However, as my valve 70 is formed of deformable material such as plastic, hard rubber, lead, etc., it will be caused to extrude through the internal passage of the ferrule 60 and if necessary down the flared tube 62 to a position where again the volume of the energy storing device is sufficient to maintain pressures below the fatigue value.

The several practical advantages which flow from this hydro-pneumatic energy storing device, or accumulator as it may be termed, are believed to be obvious from the above, and other advantages may suggest themselves to those who are familiar with the art to which this invention relates.

Having thus described the various features of the invention, what I claim as new and desire to secure by Letters Patent is:

1. An accumulator for storage of liquid which comprises, in combination:
   a rigid container having means connected to a source of liquid under pressure, which means includes a valve chamber having an axial opening, a radial opening and a radially off-set axial opening;
   a bladder operatively arranged in said container to be fixed at one end thereto and filled with a gas under pressure to confine the liquid space in said container between said bladder and the walls of said container, which liquid space is communicable with the radially off-set axial opening of said means; and deformable valve means in said valve chamber overlying said axial opening to be between it and said radially displaced axial opening at the other end of said valve chamber, said deformable valve being sized to be slightly greater in diameter than the axial opening such that upon being subjected to a predetermined pressure from the liquid space said valve may be extruded through said axial opening.

2. An accumulator for the storage of liquid which comprises, in combination:

a rigid container;

a liquid inlet means for said rigid container, said liquid inlet means including a fitting having an axial bore and a radial bore with a plug closing one end of the axial bore, which plug is provided with an axial passage radially spaced from the center line of said bore of said fitting which axial passage communicates with a radial passage leading to the inside of said container, said radial bore of said fitting being located to open into said axial bore thereof immediately underlying the inner extremity of said plug in said bore, said axial bore of said fitting being provided with a threaded end opposite that receiving said plug and having a ferrule press fitted within said threaded end immediately behind the threads thereof; and a deformable ball valve operatively connected to said inlet means and located between said ferrule and said plug in said axial bore of said fitting, which deformable valve means is sized to normally be larger than an axial passage through said ferrule with the ability to shrinkingly deform to pass through the axial passage in said ferrule when the pressure in the axial passage of said plug exceeds a predetermined value.

3. A hydro-pneumatic energy storing device comprising:

a first shell having a pneumatic opening;

a second shell having an opening for passage of hydraulic fluid;

an open ended bladder disposed within said second shell to form a hydraulic chamber with said second shell, said bladder being held within said second shell by the affixing of said first shell to said second shell whereby said first shell and said bladder form a gas chamber;

a gas charging valve operatively connected to said first shell for charging said gas chamber with a predetermined gas pressure; and a hydraulic fluid inlet valve affixed to said second shell including, a fitting having one end thereof contacting the innermost extremity of the bladder to separate the bladder from said second shell to allow the entry of hydraulic fluid around said bladder between it and said second shell, said fitting having the end opposite that in contact with said bladder affixed to a hydraulic fluid supply line, which fluid supply line is sealed therewith on a ferrule within said fitting having an internal passage of equivalent internal diameter as an internal diameter for the supply line, a radial supply port having a passage leading therefrom to a chamber behind said ferrule in said fitting which passage is of lesser diameter than the passage through said ferrule and is axially spaced from said ferrule, a plug means operatively connected to the fitting having a surface thereof in contact with the bladder internally of the contacting of the fitting therewith which plug means is provided with an axial passage of small diameter which leads to a radial passage that opens into said second container immediately underlying said bladder and is in communication with the chamber behind said ferrule, and a deformable valve means having an external diameter of greater dimension than the internal diameter of said passage which deformable valve means is capable of extruding through said fitting and into said supply line upon a pressure existing under said bladder in said second shell greater than a predetermined value to allow an expanding volume for said hydraulic fluid in said hydro-pneumatic energy storing device while preventing additional entry of pressure fluid therewithin.

References Cited

UNITED STATES PATENTS

| 2,371,293 | 3/1945 | Hoof | 137—113 X |
| 2,545,000 | 3/1951 | Martin | 137—519.5 |
| 2,931,392 | 4/1960 | Mercier | 138—30 |

FOREIGN PATENTS 511,949 8/1939 England.
802,702 10/1958 England.

LAVERNE D. GEIGER, *Primary Examiner.*

BRAD KILE, *Assistant Examiner.*